United States Patent Office 3,274,884
Patented Sept. 27, 1966

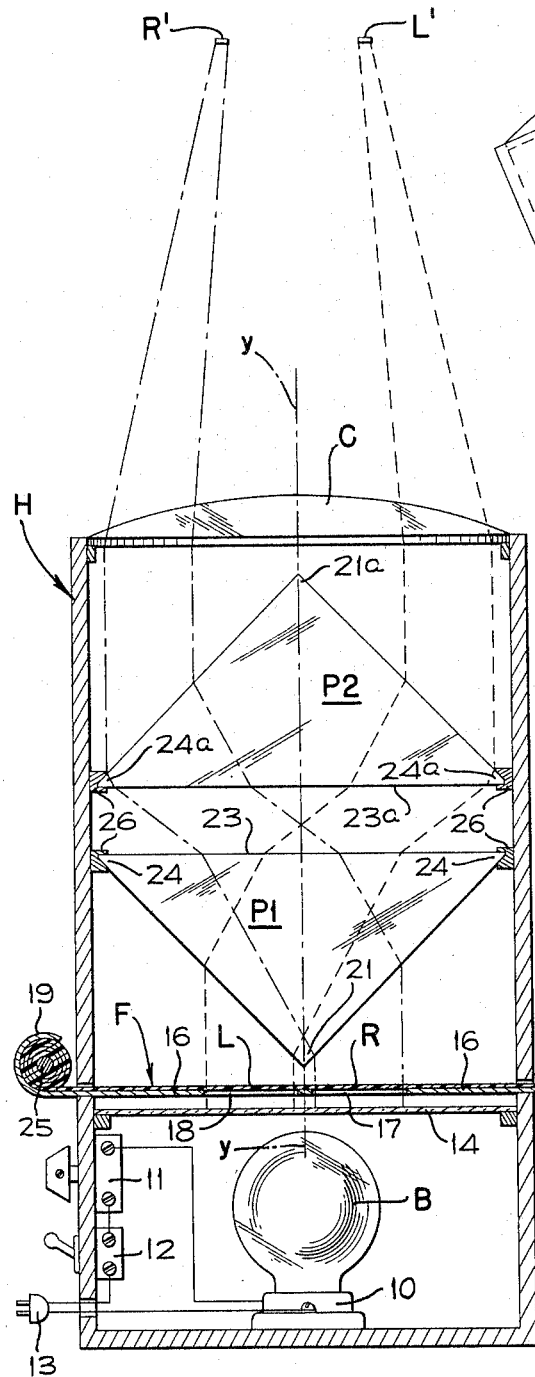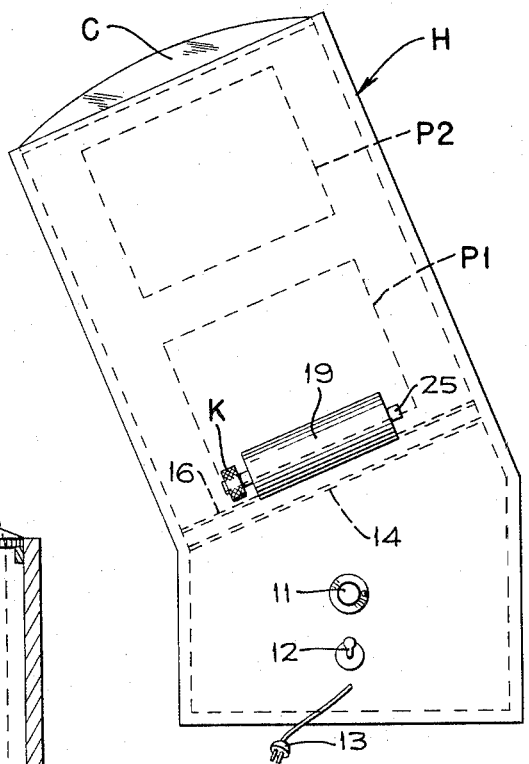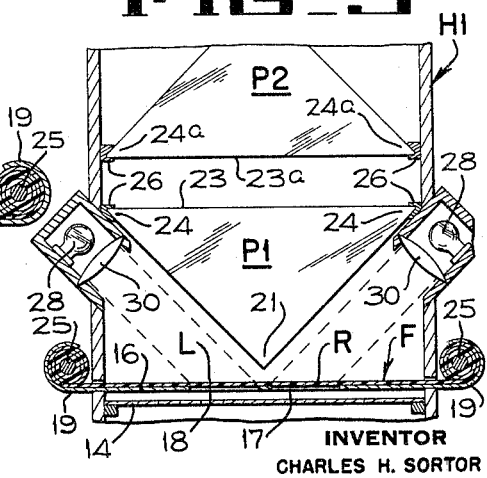

3,274,884
STEREOSCOPIC FILM VIEWING APPARATUS
Charles H. Sortor, Fresno, Calif., assignor to FMC Corporation, a corporation of Delaware
Filed May 29, 1961, Ser. No. 113,189
2 Claims. (Cl. 88—29)

This invention relates to apparatus for viewing photographic reproductions such as positive prints or positive film transparencies, the negatives of which were taken with a stereoscopic camera. The apparatus of the invention can also be used to view stereoscopic negatives directly.

In many prior viewers, it is necessary to remount the prints or transparencies, which may be referred to as scenes, in a relation that is reversed from that in which they were taken, so that as viewed by an observer the scene that represents the right side of the object as photographed will be at the observer's right, and vice-versa.

In case a series of stereoscopic scenes are taken on a strip film such as 35 mm. film, or are printed on a strip of photographic paper, this necessitates cutting the film or the strip of paper apart, and reassembling the prints or transparencies to make a separate mount for each pair of transparencies or prints that represents a stereoscopic scene. Where a large number of prints or transparencies are to be prepared for viewing, this is a tedious process.

It is an object of the present invention to provide an improved apparatus for viewing photographic reproductions. Another object is to make possible viewing of transparencies or prints as a continuous strip, with the transparencies or prints disposed in the strip as they were taken by the stereoscopic camera, so that the scenes need not be cut apart and transposed for viewing.

Another object of the invention is that of making it possible to stereoscopically view transparencies or strip prints which are adjoining, that is, that are spaced by only the minimum spacing usually provided between adjacent frames of the original film negatives.

Still another object of the invention is that of providing a viewer that is comfortable to use and which does not require effort on the part of the observer to obtain the stereoscopic effect.

Still another object is to provide a stereoscopic viewer that does not require adjustment for the interpupillary distance of the observer's eyes.

Briefly these objects are accomplished by an optical system that includes a pair of 45° prisms with the hypotenuses or bases of the prisms being spaced from one another and parallel. The prisms are arranged in the viewer so that their apices, that is the 90° angles formed by the intersection of the shorter sides of the prisms, lie on a central axis that intersects the midline between the transparencies or prints being viewed. When a stereoscopic film strip or the like is viewed from the direction in which the views were taken with the stereoscopic camera, the right and left hand scenes are given an initial transposal or reversal, so that with conventional viewers it has been necessary to physically transpose the scenes again for viewing with the viewer. With this prism arrangement the images of the transparencies or prints are transposed again optically, so that the observer sees virtual images of the scenes in their proper relative position by means of a converging viewing lens, with the scene of the right side of the actual object appearing at the observer's right, and with the scene of the left side of the object appearing at his left. The viewing device of the invention is comfortable to use, and it requires little effort for an observer to perceive the stereoscopic effect. The device is simple and requires only three optical elements, namely, a pair of prisms and a single converging lens for forming virtual images of the scenes as they are transposed by the prisms. The manner in which scenes are transposed and images thereof obtained will be apparent from the following description of the invention.

In the drawings:

FIGURE 1 is a section through a viewer designed for viewing film transparencies.

FIGURE 2 is a side elevation taken at 90° from the section of FIGURE 1.

FIGURE 3 is a fragmentary section of a modified form of a viewer designed for viewing positive prints.

Referring to the form of the invention shown in FIGURES 1 and 2 of the drawings, the entire apparatus is housed in a box like housing H, which may be of any suitable lightweight construction. The film transparencies are illuminated by a lamp B mounted in a socket 10, and a rheostat 11 is provided for controlling the amount of illumination. Instead of a rheostat, a series of lamps such as fluorescent lamps can be switched in selectively, such details forming no part of the present invention. There is also an off-on switch 12 in the illuminating circuit, and an outlet plug 13 is provided for connecting the lamp to a source of electricity. In order to better diffuse the light emanating from the lamp B, an opal or ground glass plate 14 is provided. Serving as a mask and as a means for supporting the film strip to be viewed, is a metal plate 16 having apertures 17 and 18 for the right and left hand transparencies, respectively. The plate 16 has projections 19 extending through the side walls of the housing, the projections being turned up to support the coiled ends of a strip of film F. The film F, which may be of the conventional 35 mm. size, will be a positive print or a negative strip of film exposed in a stereoscopic camera. The film F provides a right transparency R and a left transparency L. In order to cross or transpose the beams of light directed through the transparencies, a pair of prisms P1 and P2 is provided. These are 45° prisms in that their shorter sides form an apex angle of 90° and the face forming the hypotenuse of the prism makes an angle of 45° with the adjacent sides. The prisms are arranged so that prism P1 has its 90° apex 21 disposed along the central axis of the optical system, this axis being indicated at y—y. Thus, the apex 21 of prism P1 is directed toward the midline between the adjoining left and right transparencies L and R. The prism P1 has the face 23 that forms its hypotenuse arranged to be perpendicular to the optical axis y—y of the instrument. The prism P1 has its two 45° apices 24 mounted in strips 26 attached to the wall of the housing H.

The prism P2 is of the same size and shape as the prism P1 and also has its 90° apex 21a disposed on the optical axis y—y. The hypotenuse face 23a of the prism P2 is parallel to and spaced from the hypotenuse 23 of the prism P1. The prism P2 also has its 45° apices 24a mounted in strips 26 attached to the housing.

As indicated by the dashed lines and the broken lines in FIGURE 1, the prism arrangement causes the beams of light directed through the transparencies L and R to cross one another. Virtual images L' and R' of the transparencies L and R are formed by a converging lens C mounted at the top of the housing H, and these images are presented at approximately the average interpupillary distance of the human eyes. The lateral spacing of the virtual images is primarily determined by the spacing of the faces 23 and 23a of the prisms, although the refractive index of the glass of the prisms also affects such spacing of the images. In accordance with the laws of optics, in order to produce the virtual images of the scenes L and R referred to above, the film strip supporting plate 16 is disposed inside of the principal focus of the convex or converging lens C.

Since the beams of light forming the virtual images L' and R' are converged by the lens, the viewer can readily adjust his vision to the beams by moving his head toward or away from the lens C until the spacing of the images L' and R' is correct for his individual interpupillary distance. Where strip film is employed, one or both ends of the film may be wound on a spool or spools indicated at 25, and the spools can be turned by knobs K, one of which is shown in FIGURE 2.

Since the images of the transparencies in the film can be viewed without cutting and remounting the film this invention makes possible the examination of large series of stereoscopic scenes and individual scenes can be checked one against the other by running the film forward or backward as desired. The transparencies can be adjoining as indicated in FIGURE 1 and since no special mounting procedure for the transparencies is required, the device is simple and economical to use. It has been found that the device is very comfortable in the sense that it requires little or no conscious effort on the part of the viewer to obtain a stereoscopic effect.

The apparatus just described is designed for the viewing of strip film transparencies by transmitted light. Positive strip prints can also be viewed by the apparatus of the invention indicated in FIGURE 3. Here, means are added to the apparatus for providing direct, shielded illumination in a housing H1 for the left and right scenes of a positive strip print F. The direct illumination is provided by a pair of projecting lamps 28 and associated condensing lenses 30, there being one such assembly for illuminating each scene. With this arrangement, only light reflected from the film is seen, and stray light does not enter prism P1.

Although 90° prisms have been found to be suitable, in the broader aspects of the invention I have found that the apex angles of the prisms need not be exactly 90°.

The invention having thus been described, what is claimed and desired to be protected by Letters Patent is:

1. Apparatus for viewing stereoscopic photographic scenes having adjoining edges and disposed in the order in which they were exposed in the camera, comprising means for supporting adjoining scenes for viewing, means for illuminating the scenes, means for crossing the beams of light emanating directly from the scenes comprising a pair of prisms, said prisms forming isosceles triangles having coplanar apices, the planes of the bases of said prisms being spaced from but parallel to one another, the apices of said prisms lying in a plane that substantially intersects the midline between the scenes, and a single converging lens facing the apex of the prism that is remote from said scene supporting means, said scene supporting means being inside of the principal focus of said lens, said lens forming virtual images of the crossed beams of light emanating directly from the scenes in order that the scenes can be viewed stereoscopically.

2. Apparatus for viewing stereoscopic photographic scenes having adjoining edges and disposed in the order in which they were exposed in the camera, comprising means for supporting adjoining scenes for viewing, means for illuminating the scenes, means for crossing the beams of light emanating directly from the scenes comprising a pair of 45° prisms having co-planar 90° apices, the planes of the hypotenuses of said prisms being spaced from but parallel to one another, the 90° apices, the planes of the hypotenuses of said prisms being spaced from but parallel to one another, the 90° apices of said prisms lying in a plane that substantially intersects the midline between the scenes, and a single converging lens facing the 90° apex of the prism that is remote from said scene supporting means, said scene supporting means being inside of the principal focus of said lens, said lens forming virtual images of the crossed beams of light emanating directly from the scenes in order that the scenes can be viewed stereoscopically.

References Cited by the Examiner

UNITED STATES PATENTS

| | | | |
|---|---|---|---|
| 1,440,457 | 1/1923 | Girsdansky | 88—29 |
| 2,391,675 | 12/1945 | Brown | 88—29 |
| 2,709,401 | 5/1955 | Jaros | 88—31 X |
| 2,834,270 | 5/1958 | Williams. | |
| 2,891,444 | 6/1959 | Ewald | 88—29 |
| 3,039,358 | 6/1962 | Vierling | 88—29 |

FOREIGN PATENTS

| | | |
|---|---|---|
| 26,265 | 1911 | Great Britain. |
| 504,152 | 4/1939 | Great Britain. |

JEWELL H. PEDERSEN, *Primary Examiner.*

EMIL G. ANDERSON, *Examiner.*

D. J. HOFFMAN, J. K. CORBIN, *Assistant Examiners.*